United States Patent [19]

Hoy et al.

[11] Patent Number: 6,016,339

[45] Date of Patent: Jan. 18, 2000

[54] TELECOMMUNICATION NETWORK USING SIGNALLING WITHOUT ACTIVATING ALERTING DEVICES IN CONSUMER'S PREMISES

[75] Inventors: Michael D. Hoy, Ipswich; Deepak Arya, Kenton; Stuart Mason, Romford; Martyn Saunders, Sittingbourne, all of United Kingdom

[73] Assignee: British Telecommunications public limited company, London, United Kingdom

[21] Appl. No.: 08/999,704

[22] Filed: Oct. 18, 1996

Related U.S. Application Data

[63] Continuation of application No. PCT/GB95/00853, Apr. 12, 1995, which is a continuation-in-part of application No. 08/287,813, Aug. 9, 1994, abandoned.

[30] Foreign Application Priority Data

Apr. 19, 1994 [EP] European Pat. Off. .............. 94302756

[51] Int. Cl.[7] ................................................... H04M 11/00
[52] U.S. Cl. ................................ 379/106.07; 379/106.05; 379/106.09; 379/106.11; 379/207; 379/220; 379/229
[58] Field of Search ......................... 379/106.01, 106.03, 379/106.05, 106.07, 106.08, 106.09, 106.11, 373, 382, 229, 207, 219, 220

[56] References Cited

U.S. PATENT DOCUMENTS

| 4,741,022 | 4/1988 | Chebra et al. ...................... 379/106.11 |
| 4,833,618 | 5/1989 | Verma et al. ....................... 379/106.04 |
| 5,010,568 | 4/1991 | Merriam et al. .................... 379/106.07 |
| 5,022,069 | 6/1991 | Chen ....................................... 379/67.1 |
| 5,040,209 | 8/1991 | Greenberg et al. ...................... 379/373 |
| 5,161,182 | 11/1992 | Merriam et al. .................... 379/106.07 |
| 5,189,694 | 2/1993 | Garland .............................. 379/106.09 |
| 5,243,644 | 9/1993 | Garland et al. ..................... 379/106.09 |
| 5,311,581 | 5/1994 | Merriam et al. ................... 379/106.07 |
| 5,317,631 | 5/1994 | Chen ........................................ 379/164 |
| 5,327,488 | 7/1994 | Garland ................................... 379/201 |
| 5,339,354 | 8/1994 | Becker et al. ........................ 379/88.24 |
| 5,359,641 | 10/1994 | Schull et al. ....................... 379/106.09 |
| 5,381,462 | 1/1995 | Larson et al. ...................... 379/106.06 |
| 5,384,622 | 1/1995 | Hirata et al. ....................... 379/106.01 |
| 5,394,461 | 2/1995 | Garland ............................. 379/106.09 |
| 5,422,939 | 6/1995 | Kramer et al. ..................... 379/106.08 |

FOREIGN PATENT DOCUMENTS

0474407  3/1992  European Pat. Off. .

OTHER PUBLICATIONS

Kurachi et al, "New Telecommunications Service for Telemarketing", International Conference on Computer Communication, Nov. 1984, Amsterdam, NL, pp. 219–223.

Shirai et al, "Remote Automatic Meter Reading and Telecontrol System Using Telephone Lines", NEC Research and Development, No. 65, 1982, Tokyo, JP, pp. 82–92.

Patent Abstracts of Japan, vol. 17, No. 148 (E–1338), Mar. 24, 1993 & JP,A,04 313942 (Fuji Electric Co Ltd) Nov. 5, 1992.

*Primary Examiner*—Scott Wolinsky
*Attorney, Agent, or Firm*—Nixon & Vanderhye P.C.

[57] ABSTRACT

A telecommunications network includes digital main switching units and local exchanges. The local exchange is arranged to permit alternative alert signals to consumer premises by way of the local loop. The alternative signals may be cadenced to provide information to apparatus connected in a consumer's premises without causing activation of traditional telephone, facsimile or answering machines. Such information may be supplemented by the presence or absence of a line polarity reversal before the activation signal is sent and by modulated signals, such as FSK signalling.

18 Claims, 2 Drawing Sheets

TELECOMMUNICATION NETWORK USING SIGNALLING WITHOUT ACTIVATING ALERTING DEVICES IN CONSUMER'S PREMISES

CROSS-REFERENCES TO RELATED APPLICATIONS

This application is a continuation of PCT/GB95/00853 (under 35 U.S.C. §120/365), filed on Apr. 12, 1995, which is a continuation-in-part (under 35 U.S.C. §120/365) of U.S. application Ser. No. 08/287,813, filed on Aug. 9, 1994, now abandoned in favor of U.S. application Ser. No. 08/685,799, filed on Jul. 24, 1996, now abandoned.

BACKGROUND OF THE INVENTION

1. Field of the Invention

The present invention relates to telecommunications networks and more particularly to signalling protocols therefore.

2. Related Art

Traditionally public switched telephone networks (PSTN) comprise major switching nodes which are fully interconnected to each other and local switching units which depend from one or more of the major switching nodes. The local switching units are connected by a pair of electrical conductors to each point at which telephony service is required.

When a call is set up through the network a local switching unit effects a connection to the appropriate pair of conductors and applies an ac electrical signal which causes an alert at the consumer's premises.

Originally, the alert was an electromechanical bell or buzzer while later electronic tone callers were used. Because of the nature of the alert other devices such as facsimile machines, answering machine and computer modems were all adapted to respond to the signal provided to operate a bell.

Similarly, as PSTNs evolved, the required response to ringing current was a line loop which caused an electromechanical relay to operate in the exchange, disconnecting the ringing current. Now, although some forward signalling capability developed once the line was looped (for example dual tone multi-frequency signalling of digits rather than loop-disconnect signalling) PSTN signalling in the so called local loop remained at a fairly primitive level.

This being the case, most of the electrical conductors from the local switch unit are unused for much of the time since, clearly, any ringing current applied to a line would result in telephone bells ringing disturbing the household.

The assignee of the present invention has now proposed extending the use of PSTN to include telemetry and other applications of the local loop and has accordingly developed certain signalling protocols for use on consumer connections.

Previous proposals for dealing with telemetry in the local loop have included additional equipment in the local exchange and trunk overlay networks. Such equipments are expensive to provide. For example, in EP474407 there is described a telemetry system including special no-ring trunks. Other disclosures of a specific no-ring trunk arrangement may be found, for example in Shirai et al NEC Research and Development number 65, pages 82–92 an article entitled "Remote Automatic Meter Reading and Telecontrol System Using Telephone Lines".

A similar system was discussed at the International Conference on Communication November, 1984 as published in the Proceedings at pages 2192–2193 in an article entitled "New Telecommunications Service for Telemetering" by M Kurachi et al.

Providing additional overlays and re-equipping all exchanges to which telephone customers may be connected is an extremely difficult and expensive operation and if the existing telecommunications network in its entirety could be used for providing no-ring call service without substantial modification many differing services could be readily provided at minimum additional cost.

SUMMARY OF THE INVENTION

According to the present invention there is provided a telecommunications network including a plurality of switching units each connected by respective consumer lines to a multiplicity of consumer premises to provide telephony service, each switching unit including means to provide a consumer alert signal to cause operation of respective alerting devices in consumer's premises, the network being characterised in that at least one of the switching units is responsive to signals through the network from at least one other switching unit selectively to connect a network connection to the consumer's premises to permit signalling between service providers and customer premises without causing operation of alerting services electrically connected in parallel with the consumer line.

Preferably, the or each alternative signal comprises a signal of a predetermined frequency applied for a predetermined period during which the signal may be cadenced to provide preliminary information to activated apparatus.

In one embodiment the switching unit is arranged to recognise a loop response or a tone response to the alternative signals and the cadencing of the signal is used to indicate to the activated apparatus which response to provide.

BRIEF DESCRIPTION OF THE DRAWINGS

A telecommunications network in accordance with the invention will now be described by way of example only with reference to the accompanying drawing of which.

DETAILED DESCRIPTION OF EXEMPLARY EMBODIMENTS

Figure 1:
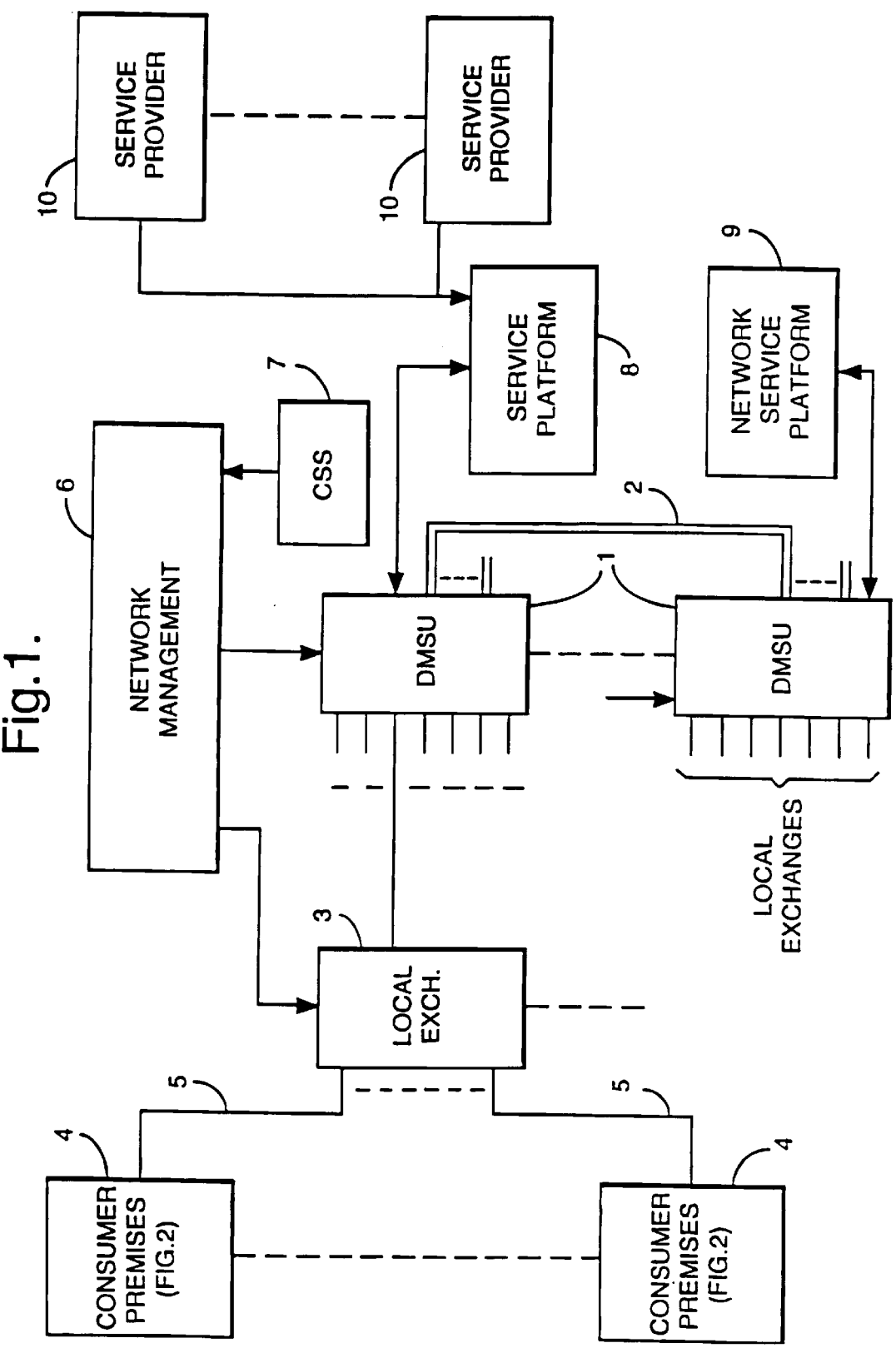
FIG. 1 shows a telecommunications network in accordance with the invention.

Referring to FIG. 1, a typical PSTN comprises a number of central switching nodes which are fully interconnected. The central switching nodes are represented here by two digital main switching units 1 (DMSU) interconnected by a high speed digital highway 2.

Each DMSU acts as a parent to a number of local exchange units 3 (only one of which is shown). The local exchange unit 3 provides service to consumer premises 4 by way of connections 5 which are sometimes referred to as local loop connections. For the purposes of the present invention the local loop connections 5 are assumed to be electrically conducting. However, it will be appreciated that adaptation of the invention for other types of local loop connection may be made.

Some kind of network management system 6 is responsive to a consumer records system 7 to provide information to the local exchanges 3 and/or DMSU 1 relating to the service permitted to any individual consumer's premises 4. This information—sometimes called class of service (COS) data—is periodically updated in local exchange data storage by the network management system 6. The control system in the local exchange 3 refers to individual COS data each time a call is originated or attempted to determine whether such a call or termination is permitted.

As thus far described the network is comparable with many such PSTNs. However, in the network of the invention, many other services may be provided to the consumer premises 4 by virtue of service access platforms 8, 9 provided at DMSU 1. As shown, the service platform 8 is accessible by independent service providers 10 while the service access platform 9 forms part of the service provided by the PSTN operator.

Thus, in our co-pending U.S. patent application 08/277,078 filed Jul. 19, 1994 (now U.S. Pat. No. 5,583,923, dated Dec. 10, 1996) apparatus for telemetry is described. Telemetry service allows service providers 10 access to a telemetry interface in consumer's premises 4 to obtain readings of meters for gas, electricity or water supply for example.

Figure 2:
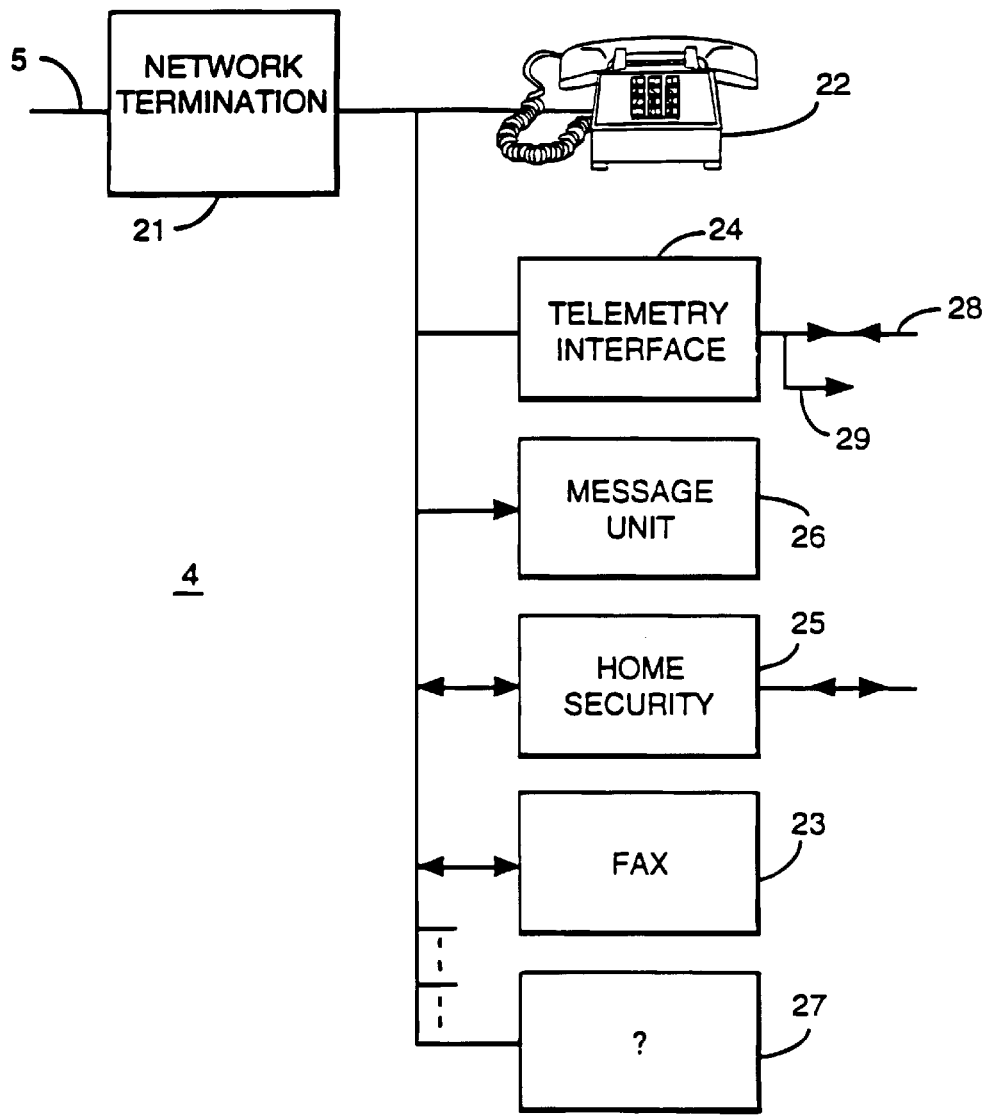
FIG. 2 shows a consumer premises arrangement in accordance with the invention.

Now referring also to FIG. 2, in consumer's premises 4, the local loop connections 5 are connected to a suitable network termination device 21 such as a master socket to which telephony apparatus may be plugged. The network termination 21 may include line balancing components and/or switching to enable centralised loop testing for example.

In most consumer premises 4 the network termination 21 will be connected to either a telephone 22 or a facsimile transmitter/receiver 23 or possibly to both and to other equipment such as answering machines or computer modems (not shown).

In parallel with the above mentioned equipments which are of the kind responsive to normal telephony signalling, that is ringing current provided by way of local loop 5, a telemetry interface 24 having access to consumer metering by way of connection 28 may be installed.

As described in the above co-pending application, the telemetry interface may also provide access by way of connection 29 for home remote control purposes. Such remote control purposes may include turning heating systems on and off, controlling lighting for security purposes and like switching.

Clearly, where telemetry access is being used by a service provider 10, it would be unacceptable to provide ringing current by way of local loop 5 since this would disturb the occupants of the consumer premises 4. Further, if the telemetry interface 24 were arranged to respond to ringing current it will be activated many more times than necessary and, if it answered by looping the line 5, this would cause ringing current to be removed resulting in loss of service to the consumer's telephone 22.

Accordingly, the DMSU 1 is arranged, when connecting calls originated by or through service platforms 8 and 9, to cause the local exchange 3 to set up a "no-ring" call.

In this case, tone signalling with or without line polarity reversals are used to activate the required apparatus. These signals may also be supplemented by subsequent frequency shift keyed (FSK) data messages. This signalling, sometimes referred to as "wake-up" signalling, does not cause any ringing current responsive apparatus to activate so should not result in inappropriate disturbance of occupants.

Several types of no-ring call are provided by the network of the invention and the following examples will facilitate understanding. Noting that signalling between the DMSU 1 and local exchange 3 is that defined as CCITT Signalling System number 7 (C7) using an additional embedded protocol the following actions occur in a telemetry call of a first kind:

on receipt of a telemetry request from the service platform 8, the DMSU 1 forwards a no-ring call "type A" or "type B" request to the local exchange 3 together with the respective identity number of the consumer premises 4. The local exchange 3 determines whether the telephone line associated with the consumer premises 4 has an "off-hook" indication and if so rejects the request. If the line 5 is free, after checking that type A or B no-ring calls are permitted from its COS data, the exchange 3 opens a forward transmission path to enable the service platform 8 or 9 to forward wake-up signalling to the line 5. Having returned signals to the platform 8 or 9 to confirm forward path availability, the exchange monitors the line 5 for an appropriate response. The C7 message protocol (call type) will inform the exchange 3 which kind of a response (either tone (type A) or loop (type B)) is expected from the telemetry unit 24 and monitoring occurs accordingly.

Figure 3:
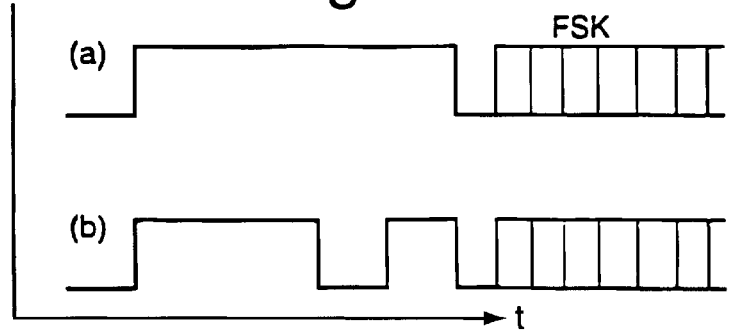
FIG. 3 is a graph showing signal provision against time.

For example, if a loop response is expected, referring also to FIG. 3, the platform 8 or 9 may forward a cadenced tone for a period of 500 ms. This may be as shown in FIG. 3 by providing, say, 300 ms on, 100 ms off and 100 ms on. Other cadencing or modulation techniques (for example FSK) could be used. If no loop is detected by the end of a short period after tone removal then the exchange 3 will signal a call failed message to the DMSU 1. The DMSU 1 forwards the message to the appropriate service platform. If a loop on the line 5 is detected then forward and reverse speech channels are completed between the service platform 8 or 9 and the consumer premises 4. In this case no tone detection apparatus is allocated by the exchange 3 and any tones forwarded from consumer premises 4 will not be recognised by the exchange.

However, if the C7 message indicates that a tone response is anticipated then the exchange 3 will allocate a tone receiver to the line 5 for the detection period. In this case the service platform 8,9 may indicate the requirement for a tone response from the telemetry interface 24 by a continuous wake-up tone. The exchange 3 reacts to answer/no answer conditions (tone/no tone) in the manner previously described. It is here noted that tone answer from the consumer premises 4 does not require the line to be looped such that the entire proceedings of a no-ring call can occur without an off-hook condition existing.

Each of the above mentioned types of no-ring call may be preceded by line polarity reversal applied to the line 5 giving a further variation in the information provided to activate specified equipments. As may be appreciated using different frequencies and differing combinations of frequencies different equipments connected to the line may be selectively activated. In one method used to identify specific action required from the responding apparatus or specifically to identify apparatus to be activated, the wake up signalling is followed by a data packet using for example FSK modulation.

The response to wake up signalling may comprise a dual tone multi frequency (DTMF) digit which can be used to identify the type of equipment responding. Thus, if differing types of responding apparatus require different subsequent activity by the service platform 8 or 9 then the one type may return say DTMF signal "A" while other types may return DTMF signals in the range "B" to "D".

Some traditional apparatus responsive to ringing current can also be adapted to respond to no-ring call types. For example the facsimile transceiver 23 may be arranged to respond to a no-ring call rather than to ringing current so that the line 5 may be used to ring the telephone 22 or to activate the facsimile machine 23 by the network thus eliminating the need for multiple lines by arranging different apparatus to respond to differing identities.

The C7 message may identify a differing apparatus for example a message logging unit 26. The message unit 26, which may be part of a telephone, is arranged to received text messages. thus a service provider 10 having access to the network may send a message to the consumer. Authorised users could, for example, arrange for advertising to be sent to a digital display unit in the consumer's premises. Similarly, messages from family, friends or service providers could be left, for example to inform the customer that articles left for servicing were ready for collection.

Other network service platforms 9 may be arranged to forward indicators to the consumer premises. For example, if network-based call answering service is being used, then on receipt of a voice message for the consumer premises 4 the platform 9 may be arranged to cause an indicator to be lit. In this case, the C7 message to the exchange 3 causes establishment of a forward speech/data path through the network to allow in-band data to be transferred from the service platform. Since no answer is expected from the indicator unit, the exchange 3 generates a network answer condition which confirms completion of the call path through the network.

Apart from telemetry, telecontrol and no-ring facsimile identification, message waiting indication and the like, many other apparatuses (schematically represented by block 27) can be adapted to respond to no-ring wake-up signalling without adversely affecting normal telephony services or other telecommunications network-based services such as home security alarm monitoring 25 and similar.

For the avoidance of doubt, although specific wake up signalling to cause activation has been mentioned, other signalling arrangements may be used. In a further example, dual tone signalling is used with a first tone being continuous and the second tone being cadenced. This enables simple detection arrangements to be used whereby the first signal is detected by use of a band pass filter the output of which may enable the second tone signal path. Thus unless the first tone is present no additional monitoring is required and only a single frequency detector need be permanently on line.

As will be recognised, further variants of signalling, such as varying cadences of more than one component of multi frequency signalling used as an activation tone, can be used without departing from the concepts herein described.

For the avoidance of doubt it is emphasized that no additional equipment is required in the local exchanges 3 nor are overload trunks of any description provided in present implementation. The network is responsive to information from a service platform inserted at a DMSU at any level using C7 signalling between the DMSU and the local exchange to avoid using separate trunks for no-ring call alerting.

What is claimed is:

1. A telecommunications network comprising:
   a plurality of switching units each connected by respective consumer lines to a multiplicity of consumer premises to provide telephony service,
   each switching unit including means to provide a first consumer alert signal to cause operation of alerting devices in consumer's premises,
   at least one of the switching units being responsive to signals through the network from at least one other switching unit to effect a connection to the consumer's premises to permit signalling between service providers and customer premises without causing operation of alerting devices electrically connected in parallel with the consumer line, and
   means for effecting a non-alerting network connection to the consumer's premises wherein an activation signal having at least one frequency component is supplied to activate apparatus in the consumer's premises, the activation signal being cadenced as a plurality of predetermined duration pulses to indicate to the activated apparatus whether one of a tone response and a loop response is to be forwarded to the network.

2. A telecommunications network as in claim 1 wherein, in addition to the activation signal, the presence or absence of a line polarity reversal is used to provide additional information to the activated apparatus.

3. A telecommunications network as in claim 1 wherein at least a portion of the activation signal is provided through a network speech or data path from apparatus remote from the switching unit.

4. A telecommunications network as in claim 1 wherein at least part of the activation signal is provided by the switching unit.

5. A telecommunications network as in claim 1 wherein the activation signal is followed by further signalling to specify a required response.

6. A telecommunications network as in claim 1 wherein the switching unit is arranged to provide an answer condition to the network without requiring an answer condition from consumer premises.

7. A telecommunications network as in claim 1 wherein network apparatus is responsive to variable answering signals received from the activated apparatus to determine a subsequent procedure.

8. A method of activating apparatus at a consumer's premises via a telecommunications network including a plurality of switching units, each connected by respective consumer lines to a multiplicity of consumer premises to provide telephony service, each switching unit including means to provide a first consumer alert signal to cause operation of alerting devices in consumer's premises, at least one of the switching units being responsive to signals through the network from at least one other switching unit to effect a connection to the consumer's premises to permit signalling between service providers and customer premises without causing operation of alerting devices electrically connected in parallel with the consumer line, said method comprising:
   effecting a non-alerting network connection to the consumer's premises wherein an activation signal having at least one frequency component is supplied to activate apparatus in the consumer's premises, the activation signal being cadenced as a plurality of predetermined duration pulses to indicate to the activated apparatus whether one of a tone response and a loop response is to be forwarded to the network.

9. A method as in claim 8 wherein, in addition to the activation signal, the presence or absence of a line polarity reversal is used to provide additional information to the activated apparatus.

10. A method as in claim 8 wherein at least a portion of the activation signal is provided through a network speech or data path from apparatus remote from the switching unit.

11. A method as in claim 8 wherein at least part of the activation signal is provided by the switching unit.

12. A method as in claim 8 wherein the activation signal is followed by further signalling to specify a required response.

13. A method as in claim 8 wherein the switching unit is arranged to provide an answer condition to the network without requiring an answer condition from consumer premises.

14. A method as in claim 8 wherein network apparatus is responsive to variable answering signals received from the activated apparatus to determine a subsequent procedure.

15. A method of providing selective activation of certain customer premise equipment via a public switched telephone network (PSTN) without use of ringing current and without requiring an off-hook local loop connection response, said method comprising:

sending a non-ringing activation signal of at least one predetermined frequency at a predetermined cadence from a local switch in the PSTN to a customer's premises in response to a signaled request from another switch in the PSTN, the predetermined cadence uniquely corresponding to whether one of a tone response and a loop response is being requested from the customer premise equipment via the PSTN; and detecting the predetermined cadence of said non-ringing activation signal at said certain customer premise equipment and responding with respectively correspondingly on-hook signaling back to the local switch of the PSTN.

16. A method as in claim 15 wherein said predetermined cadence comprises predetermined on and off durations of said non-ringing activation signal.

17. A method as in claim 15 wherein at least a portion of the activation signal is provided through a network speech or data path from apparatus remote from the local switch.

18. A method as in claim 15 wherein the local switch is arranged to provide an answer condition to the network without requiring an answer condition from consumer premises.

* * * * *